US006264843B1

(12) United States Patent
Wiesner

(10) Patent No.: US 6,264,843 B1
(45) Date of Patent: Jul. 24, 2001

(54) PROCESS FOR RECLAIMING A SUSPENSION

(75) Inventor: Peter Wiesner, Marktl (DE)

(73) Assignee: Wacker Siltronic Gesellschaft für Halbleitrmaterialien AG, Burghausen (DE)

( * ) Notice: Subject to any disclaimer, the term of this patent is extended or adjusted under 35 U.S.C. 154(b) by 0 days.

(21) Appl. No.: 09/526,835

(22) Filed: Mar. 16, 2000

(30) Foreign Application Priority Data

Mar. 18, 1999 (DE) ............................................. 199 12 252

(51) Int. Cl.[7] ........................... B01D 35/06; B01D 37/00; B03C 1/00

(52) U.S. Cl. .......................... 210/695; 210/767; 210/806; 210/223; 451/88

(58) Field of Search ..................................... 210/695, 767, 210/776, 223, 787, 805, 806; 451/88

(56) References Cited

U.S. PATENT DOCUMENTS

| | | | |
|---|---|---|---|
| 4,810,368 | 3/1989 | Seider et al. . | |
| 5,529,695 * | 6/1996 | Gwozdz | 210/695 |
| 5,772,900 * | 9/1998 | Yorita et al. | 210/805 |
| 5,830,369 | 11/1998 | Toyama . | |

FOREIGN PATENT DOCUMENTS

| | | |
|---|---|---|
| 195 35 397 | 3/1997 | (DE) . |
| 2 704 455 | 11/1994 | (FR) . |

OTHER PUBLICATIONS

English Derwent Abstract AN 1997–193730 [18] Corresp. to DE 195 35 397.

Derwent Abstract 1996 27033 1 [28] for FR 2 704 455.

Patent Abstracts of Japan, vol. 1999, No. 02 Feb. 26, 1999 & JP 10309647 A (Tadco Corp., Nov. 24, 1998.

T. J. Drozda, (Wick: "Tool and Manufacturing Handbook, vol. 1, Machining", 1983 Society of Manufacturing Engines (SME) Deaborne(US), p 4–19), 34–39.

* cited by examiner

*Primary Examiner*—David A. Reifsnyder
(74) *Attorney, Agent, or Firm*—Collard & Roe, P.C.

(57) ABSTRACT

A process for reclaiming a suspension which is produced during the machining of semiconductor material and which contains a liquid, a substance with an abrasive action and abraded semiconductor material, includes separating off the substance with an abrasive action and then separating the liquid and the abraded material. In the process, the liquid and the abraded material are separated with the aid of a magnetic separator.

3 Claims, No Drawings

PROCESS FOR RECLAIMING A SUSPENSION

BACKGROUND OF THE INVENTION

1. Field of the Invention

The present invention relates to a process for reclaiming a suspension which is produced during the machining of semiconductor material and contains a liquid, a substance with an abrasive action and abraded semiconductor material, by separating off the substance with an abrasive action and then separating the liquid and the abraded material.

2. The Prior Art

U.S. Pat. No. 5,830,369 describes a process of this type and according to this document, a centrifuge is to be used to separate the abraded material and the liquid.

SUMMARY OF THE INVENTION

It is an object of the present invention to provide a simpler, less expensive process.

This object is achieved according to the present invention by means of a process for reclaiming a suspension which is produced during the machining of semiconductor material and contains a liquid, a substance with an abrasive action and abraded semiconductor material, by separating off the substance with an abrasive action and then separating the liquid and the abraded material. The liquid and the abraded material are separated with the aid of a magnetic separator.

The present invention is suitable in particular for reclaiming a suspension which is produced when cutting semiconductor wafers from a hard brittle material using a wire saw or when lapping such semiconductor wafers.

The present invention is surprising since it was impossible to expect that abraded nonmagnetic material such as semiconductor material would be suitable for separation with the aid of a magnetic separator. It has been discovered that abraded nonmetallic material, for example abraded silicon-containing material, forms magnetizable agglomerates with abraded metal-containing material from, for example, the sawing wire of a wire saw or a lapping plate.

The present invention makes it possible to dispense with complex removal of abraded material by centrifuging.

According to a preferred embodiment of the invention, after semiconductor wafers have been cut or lapped, some or all of the suspension produced is removed from the machine and fed to a decanter. The suspension comprises a liquid, a substance with an abrasive action and the abraded material which is produced during the cutting or lapping and is in turn composed of semiconductor material and abraded metallic material. Firstly, in a decanter, the substance with an abrasive action is separated from the rest of the suspension. In the decanter, the suspension, which is also known in the trade jargon as a slurry, firstly passes through a clarification zone, in which some of the substance with an abrasive action settles out. Then, the slurry is guided outwards under pressure through a shearing nozzle, the substance with an abrasive action substantially remaining in the decanter.

The substance with an abrasive action may also be separated from the rest of the suspension by centrifuging, since the centrifuging is in this case less complex than the removal of the abraded material by centrifuging.

The liquid leaving the decanter substantially contains abraded material and possibly small residues of substance with an abrasives action which has not been separated. According to the invention, this solids-containing liquid is fed to a magnetic separator which magnetically retains the solids fractions, so that the liquid and the solids are separated. The recovered liquid and the substance with an abrasive action which has been separated off in the decanter are preferably used to make up a fresh suspension. This fresh suspension for example, is used again to cut or lap semiconductor wafers and is still free of abraded material.

Suitable liquids are in particular oils or aqueous solutions, optionally in each case containing auxiliaries such as surfactants or polymers. The substance with an abrasive action which is preferably used is hard particles of aluminum oxide, silicon carbide or boron carbide.

The abraded material which is separated according to the invention preferably contains silicon or silicon carbide as the semiconductor material.

Accordingly, while a few embodiments of the present invention have been shown and described, it is to be understood that many changes and modifications may be made thereunto without departing from the spirit and scope of the invention as defined in the appended claims.

What is claimed is:

1. A process for reclaiming a suspension which is produced during the machining of semiconductor material comprising providing a suspension which contains a liquid, a substance with an abrasive action and an abraded semiconductor material;

separating off the substance with an abrasive action; and then separating the liquid and the abraded semiconductor material with the aid of a magnetic separator.

2. The process as claimed in claim 1, wherein the abraded semiconductor material contains a solid selected from the group consisting of silicon and silicon carbide.

3. The process as claimed in claim 1, wherein the machining of semiconductor material is selected from the group consisting of cutting of semiconductor wafers and lapping of semiconductor wafers.

* * * * *

UNITED STATES PATENT AND TRADEMARK OFFICE
CERTIFICATE OF CORRECTION

PATENT NO. : 6,264,843 B1
DATED : July 24, 2001
INVENTOR(S) : Peter Wiesner

It is certified that error appears in the above-identified patent and that said Letters Patent is hereby corrected as shown below:

Title page,
Item [73], change the spelling of the assignee to correctly read -- Wacker Siltronic Gesellschaft für Halbleitermaterialien AG --.

Signed and Sealed this

Sixteenth Day of April, 2002

Attest:

JAMES E. ROGAN
*Director of the United States Patent and Trademark Office*

*Attesting Officer*